United States Patent
Lee et al.

(10) Patent No.: US 8,518,152 B2
(45) Date of Patent: Aug. 27, 2013

(54) METHOD FOR MANUFACTURING ELECTROSTATIC NON-WOVEN INTAKE FILTER AND ELECTROSTATIC NON-WOVEN INTAKE FILTER USING THE SAME

(75) Inventors: Sangil Lee, Suwon-si (KR); Jungmin Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 434 days.

(21) Appl. No.: 12/907,758

(22) Filed: Oct. 19, 2010

(65) Prior Publication Data

US 2011/0132195 A1 Jun. 9, 2011

(30) Foreign Application Priority Data

Dec. 3, 2009 (KR) .................. 10-2009-0119181

(51) Int. Cl.
*B03C 3/28* (2006.01)
*B03C 3/30* (2006.01)

(52) U.S. Cl.
USPC ........... 95/58; 55/DIG. 5; 55/DIG. 39; 95/59; 96/15; 96/17; 96/66; 96/68; 96/69; 264/478; 264/479; 264/DIG. 48

(58) Field of Classification Search
USPC ............. 96/15, 17, 66, 68, 69, 98; 95/57–59; 55/385.3, 520, 527, 528, DIG. 5, DIG. 39; 264/413, 478, 479, DIG. 8, DIG. 48
See application file for complete search history.

(56) References Cited

U.S. PATENT DOCUMENTS

| | | | | | |
|---|---|---|---|---|---|
| 4,477,377 | A | * | 10/1984 | Izatt et al. | 423/181 |
| 4,912,183 | A | * | 3/1990 | Kneafsey et al. | 526/202 |
| 5,419,953 | A | | 5/1995 | Chapman | |
| 5,468,382 | A | * | 11/1995 | Cook et al. | 210/232 |
| 5,935,303 | A | * | 8/1999 | Kimura | 96/69 |
| 6,120,584 | A | * | 9/2000 | Sakata et al. | 96/135 |
| 6,824,718 | B2 | * | 11/2004 | Eitzman et al. | 264/101 |
| 7,008,465 | B2 | | 3/2006 | Graham et al. | |
| 7,052,532 | B1 | * | 5/2006 | Liu et al. | 96/154 |
| 7,390,443 | B1 | * | 6/2008 | Choi | 264/6 |
| 2007/0283809 | A1 | * | 12/2007 | Boulay et al. | 96/15 |

FOREIGN PATENT DOCUMENTS

| | | | | | |
|---|---|---|---|---|---|
| GB | 2060259 | A | * | 4/1981 | 55/DIG. 5 |
| JP | 53-53074 | A | * | 5/1978 | 55/DIG. 39 |
| JP | 62-140614 | A | | 6/1987 | |
| JP | 2007-94167 | A | | 4/2007 | |
| KR | 10-0225024 | B1 | | 7/1999 | |
| KR | 10-0246936 | B1 | | 12/1999 | |
| KR | 2002-0020382 | A | | 3/2002 | |
| KR | 20020031966 | A | | 5/2002 | |
| KR | 10-2005-0077411 | A | | 8/2005 | |
| KR | 10-2008-0010429 | A | | 1/2008 | |

\* cited by examiner

*Primary Examiner* — Richard L Chiesa
(74) *Attorney, Agent, or Firm* — Morgan, Lewis & Bockius LLP

(57) ABSTRACT

A method for manufacturing an electrostatic non-woven intake filter, may include a fabric preparation process that weaves at least a kind of fiber fabric into a web, and a filter fabric manufacturing process that weaves the web into a felt that has at least a layer, and manufactures an electrostatic non-woven intake filter material that is a non-woven fabric having a fiber tissue having a semipermanent electrostatic force by allowing a binder and an electrostatic material to permeate the felt.

19 Claims, 2 Drawing Sheets

(A)

(B)

(C)

METHOD FOR MANUFACTURING ELECTROSTATIC NON-WOVEN INTAKE FILTER AND ELECTROSTATIC NON-WOVEN INTAKE FILTER USING THE SAME

CROSS-REFERENCE TO RELATED APPLICATIONS

The present application claims priority to Korean Patent Application Number 10-2009-0119181 filed Dec. 3, 2009, the entire contents of which application is incorporated herein for all purposes by this reference.

BACKGROUND OF THE INVENTION

1. Field of the Invention

The present invention relates to a foreign substance filtration filter, and more particularly, to a method for manufacturing an electrostatic non-woven intake filter and an electrostatic non-woven intake filter using the same.

2. Description of Related Art

In general, an air cleaner that is installed in a vehicle absorption machine includes a filter that filters a foreign substance in an outside air that is supplied to an engine, and the filter is made of a non-woven fabric material.

The outside air that inflows in a greater amount because of an increase in engine output requires improved high performance purification efficiency of the air cleaner, which requires an increase in filtration area of the filter that performs filtration.

However, an increase in filtration area of the filter causes an increase in cost, and the size of the air cleaner is inevitably increased, which negatively impacts a space shortage of and a layout of an engine room.

In addition, if the filtration area of the filter is set by a high output engine, since a separate air cleaner that is set by a relatively low output engine should be manufactured, two air cleaners should be manufactured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are to provide a method for manufacturing an electrostatic non-woven intake filter that can increase a dust holding capacity by reinforcing an electrostatic effect of the filter to optimize a correlation between the filtration efficiency and the dust holding capacity that are in inverse proportion, and to provide an electrostatic non-woven intake filter that satisfies performance that is required in a high output engine while the size of the air cleaner is not increased by applying the filter that has an increased dust holding capacity per unit area to the air cleaner by using the electrostatic effect and the interception effect.

In an aspect of the present invention, the method for manufacturing an electrostatic non-woven intake filter may include a fabric preparation process that weaves at least a kind of fiber fabric into a web; and a filter fabric manufacturing process that weaves the web into a felt that has at least a layer, and manufactures an electrostatic non-woven intake filter material that may be a non-woven fabric having a fiber tissue having a semipermanent electrostatic force by allowing a binder and an electrostatic material to permeate the felt.

As the electrostatic material, a calixarene compound kind that has the pH of 6.0 to 9.0 may be applied.

The fabric preparation process may be performed by a step for making at least a kind of fiber material into a fine mix state by using a hopper, and a step for weaving the mixed fibers that are discharged from the hopper in a carding step into the web that may be manufactured by using strands of fibers.

The method for manufacturing the electrostatic non-woven intake filter may further include a step for forming the web that has the improved evenness after the carding step by overlapping the web.

The filter fabric manufacturing process weaves the web by using strands of fibers in a confounding or random manner, weaves the felt that has the at least a layer, synthesizing the electrostatic material in conjunction with the binder to allow the electrostatic material to permeate the felt so that the electrostatic non-woven intake filter material that may be the non-woven fabric may be manufactured, drying the electrostatic non-woven intake filter material, and shaping the electrostatic non-woven intake filter material in a roll form, wherein the felt has a structure that includes three layers having different composition degrees, wherein thicknesses of the three layers are different from each other, and wherein the three layers includes a fine layer, a middle layer and a bulk layer formed sequentially and the thickness of the fine layer may be smallest and the thickness of the bulk layer may be largest.

The electrostatic material and the binder that are powder type are mixed and provided.

The method for manufacturing the electrostatic non-woven intake filter may further include a filter processing process as a post treatment process of the electrostatic non-woven intake filter material, which forms a frame that receives the electrostatic non-woven intake filter material; and the electrostatic non-woven intake filter finish process that adds a packing to the frame to obtain sealing, thereby manufacturing the electrostatic non-woven intake filter, wherein the filter processing process may be a step that overlaps the electrostatic non-woven intake filter materials to obtain a bent form and forms the frame constituting a circumference that receives the electrostatic non-woven intake filter material, and wherein the frame may be obtained by injection molding a plastic.

In another aspect of the present invention, an electrostatic non-woven intake filter that may be manufactured through the above method and has an internal fiber tissue having a semi-permanent electrostatic force, wherein the internal fiber tissue may be permeated by the electrostatic material and has a structure of three layers having different fiber composition degrees, wherein the three layers sequentially include a bulk layer, middle layer and fine layer that allow the electrostatic material to permeate the three layers, wherein the bulk layer, middle layer and fine layer formed sequentially have different thicknesses, wherein the thickness of the fine layer may be smallest and the thickness of the bulk layer may be largest, and wherein in the bulk layer, middle layer and fine layer, the electrostatic material may be uniformly distributed.

The bulk layer and middle layer preferentially require dust holding capacity performance and aeration resistance performance, and the fine layer preferentially requires efficiency/aeration performance and bendability/shape maintaining function.

According to the present invention, it has an effect that a cost is lowered and a weight is lowered because of an increase in dust holding capacity by using an electrostatic effect and an interception effect of a filter.

In addition, it has effects that it is unnecessary to form two air cleaners according to an engine output performance and it is unnecessary to consider an engine room layout effect that is generated by an increase in air cleaner size.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
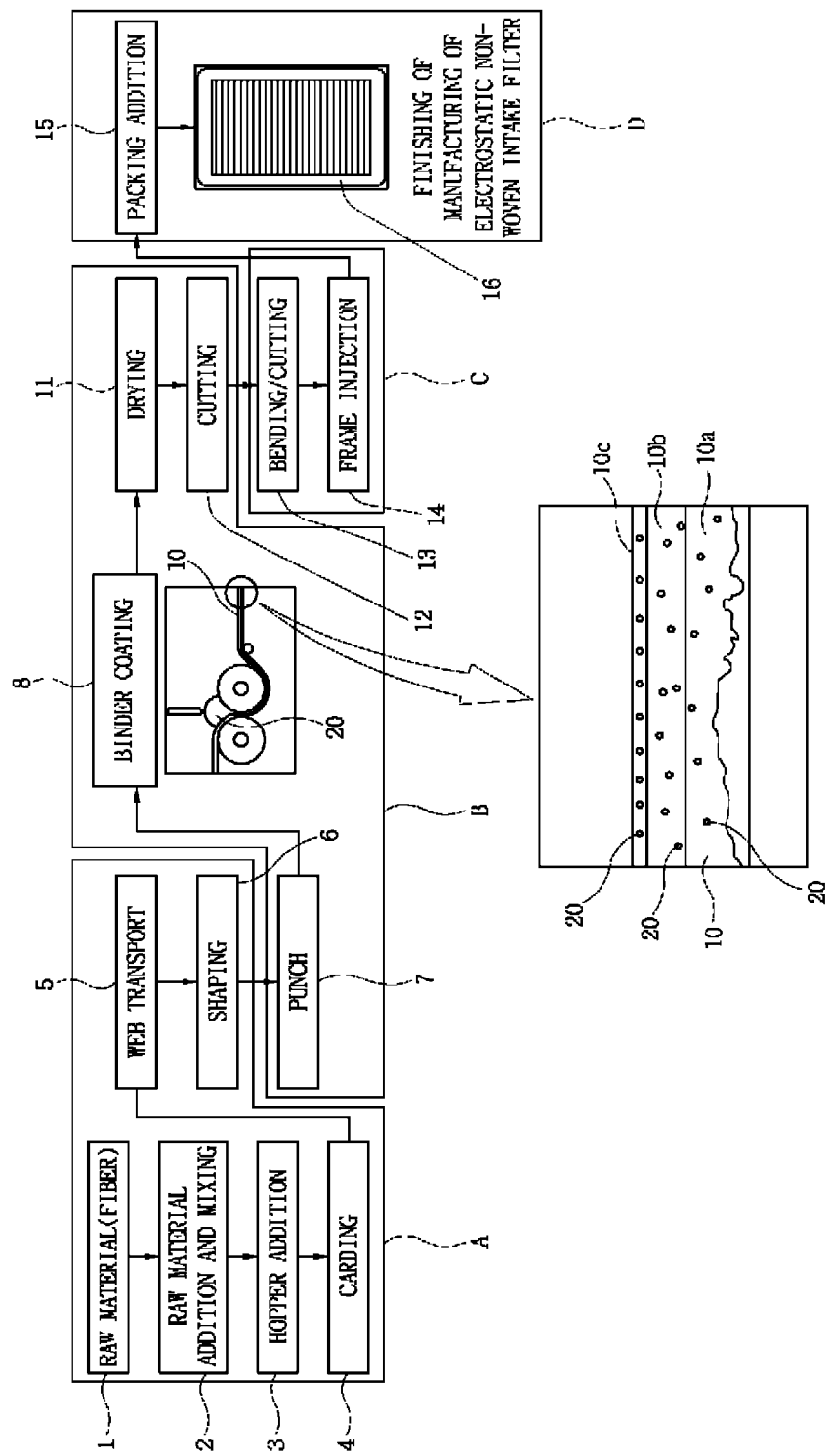
FIG. 1 is a flow chart that illustrates a method for manufacturing an electrostatic non-woven intake filter according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention manufactures an electrostatic non-woven intake filter that increases a dust holding capacity per unit area by reinforcing an electrostatic and interception effect of the filter among a diffusion, inertia, gravity, electrostatic and interception effects of the filter to optimize a correlation between the filtration efficiency and the dust holding capacity that are in inverse proportion.

The diffusion effect is a collection effect that relatively small particles that perform the Brown movement are collected by fibers because a movement distance between the fibers of the filter is long and has no directionality.

The inertia effect is a collection effect that the particles that approach the fibers through a flow of fluid deviate from the air current by its inertia and collide the fibers of the filter.

The gravity effect is a collection effect that the particles that approach the fibers through a flow of air deviate from the air current by its gravity and precipitate on the fibers of the filter.

The electrostatic effect is an effect that the particles that are charged with + or − among the particles that float in the air are collected by the fibers of the filter that has a permanent electric polarization and forms an electric field (magnetic field) therearound because of an electrostatic force, and the floating particles that are not charged with neutral property are collected on the fibers because an induction charge is generated by the electrostatic non-woven intake filter fibers.

The interception effect is a collection effect that even though the particles move through a flow of fluid, they are collected by the fibers because of the size of the particle.

FIG. 1 illustrates a process for manufacturing an electrostatic non-woven intake filter according to an exemplary embodiment of the present embodiment.

As shown in the drawing, it is configured by a fabric preparation process A for preparing raw materials, a filter fabric manufacturing process B for manufacturing a primary electrostatic non-woven intake filter material 10 by coating an electrostatic material 20 on the fiber that is processed through fabric preparation process A, a filter processing process C for manufacturing the electrostatic non-woven intake filter material that has a predetermined size by processing electrostatic non-woven intake filter material 10 that is manufactured through the primary processing through a secondary processing, and an electrostatic non-woven intake filter finish process D for manufacturing an electrostatic non-woven intake filter 16 by packing electrostatic non-woven intake filter material 10 that is processed to a predetermined size in the filter frame.

Electrostatic material 20 is a powder form that has a semi-permanent electrostatic force, and a Calixarene compound kind that has the pH of 6.0 to 9.0.

Fabric preparation process A according to an exemplary embodiment of the present embodiment prepares various kinds of fiber materials in a fiber preparation step 1, and mixes the prepared fibers with each other according to the kind in a fiber mixing step 2.

The fibers that are primarily mixed with each other through fiber mixing step 2 are more finely mixed with each other in a hopper mixing step 3, and this is discharged in a predetermined amount for the next step.

In hopper mixing step 3, a hopper device that is provided with equipments for discharging the mixed raw material is used.

A carding step 4 that is performed followed by hopper mixing step 3 is performed by weaving the mixed fibers that are discharged from the hopper into a web that is manufactured by using strands of fibers.

The carding is a process that collects the fibers that are distributed in a weaving manufacturing process and uses a carding machine in order to make the fibers in an equilibrium state, and the above manufacturing state is called a web.

As described above, the web that is manufactured through the carding operation is further treated in a web finish step 6 after a transport step 5, such that a web having the high evenness is manufactured.

In web finish step 6, in order to increase the evenness of the web, the web is obtained by weaving them by an overlapping manner.

As described above, if fabric preparation process A is accomplished, various kinds of fibers are woven again through the carding step after an initial weaving state is unwoven, thereby obtaining a web.

The aeration property of the web depends on the weaving state of the fiber strand, and at this time, the aeration property does not affect the aeration property of electrostatic non-woven intake filter material 10.

Filter fabric manufacturing process B is a process that manufactures the non-woven fabric that is electrostatic non-woven intake filter material 10 by using the web that is woven in fabric preparation process A, and in this process, the coating is performed by allowing electrostatic material 20 to permeate.

A felt step 7 is a process that weaves the web again to make the felt that allows electrostatic material 20 to easily permeate it.

Felt step 7 uses a needle punch that is a weaving device in order to convert the web into the felt, and the needle punch weaves the felt by a manner in which fiber strands are confounded with each other.

The felt is a fiber fabric that is in a state directly before electrostatic non-woven intake filter material 10 is manufactured, and has a structure in which at least one layer overlaps.

As an example thereof, in the present embodiment, it has a structure in which three layers of different fiber tissues having the different composition degrees are sequentially formed, and a difference in composition degrees does not lower the aeration property because of the function of electrostatic material 20 that permeates it.

The above layers are woven so that their thicknesses are different from each other in order to increase main functions thereof.

A coating step 8 is a process that allows electrostatic material 20 to permeate the felt so that the coating is performed, and a manner where electrostatic material 20 in a powder type is compounded in conjunction with a binder at a high speed and added to the felt is applied thereto.

The binder coating manufactures the felt by using electrostatic non-woven intake filter material 10 that includes electrostatic material 20 by providing electrostatic material 20 in conjunction with the binder while the felt is transported between two rollers in general.

As described above, when electrostatic material 20 is coated, if necessary, the binder is applied in order to increase the permeability and absorptivity of electrostatic material 20, but if necessary the other material or various operations may be used.

In addition, when electrostatic material 20 is coated, it is possible to uniformly form electrostatic material 20 regardless of the thickness of the felt by changing the coating direction of electrostatic material 20 that includes in respects to the felt.

As described above, electrostatic non-woven intake filter material 10 that is permeated by electrostatic material 20 is dried in a dry step 11, and is converted into the non-woven fabric that is wound in a roll state in a cut step 12.

As described above, electrostatic non-woven intake filter material 10 that is manufactured through filter fabric manufacturing process B has a semipermanent electrostatic force, and the dust holding capacity performance that is charged with + or − by the electrostatic force may be increased.

In addition, electrostatic non-woven intake filter material 10 includes at least three different layers that are permeated by electrostatic material 20 because of the layer structure of the felt that includes the layers having at least three different composition degrees.

As an example thereof, as shown in a partial expanded cross-sectional view of FIG. 1, it has a structure in which bulk layer 10a, middle layer 10b, and fine layer 10c that allow electrostatic material 20 to permeate are sequentially formed.

Electrostatic non-woven intake filter material 10 allows air to flow into a bulk layer 10a and after it passes through a middle layer 10b, it is discharged through a fine layer 10c, thereby acting as the filter.

In addition, bulk layer 10a, middle layer 10b, and fine layer 10c have the uniform amount of permeating electrostatic material 20, but it is possible to optimize the performance of each layer by forming the compositional ratios having different fiber weaving states in the felt weaving step.

In the present embodiment, bulk layer 10a that allows external air to flow thereinto preferentially requires dust holding capacity performance and aeration resistance performance, middle layer 10b preferentially requires dust holding capacity performance and aeration resistance performance, and fine layer 10c preferentially requires efficiency/aeration performance and bendability/shape maintaining function.

In respect to the above function, electrostatic non-woven intake filter material 10 according to an exemplary embodiment of the present embodiment has a state in which bulk layer 10a, middle layer 10b, and fine layer 10c have different thicknesses.

On the basis of the thickness of bulk layer 10a, middle layer 10b has a smaller thickness, and fine layer 10c has the smallest thickness, and the degree of difference in thicknesses forms an appropriate relation according to the required performance.

Figure 2:
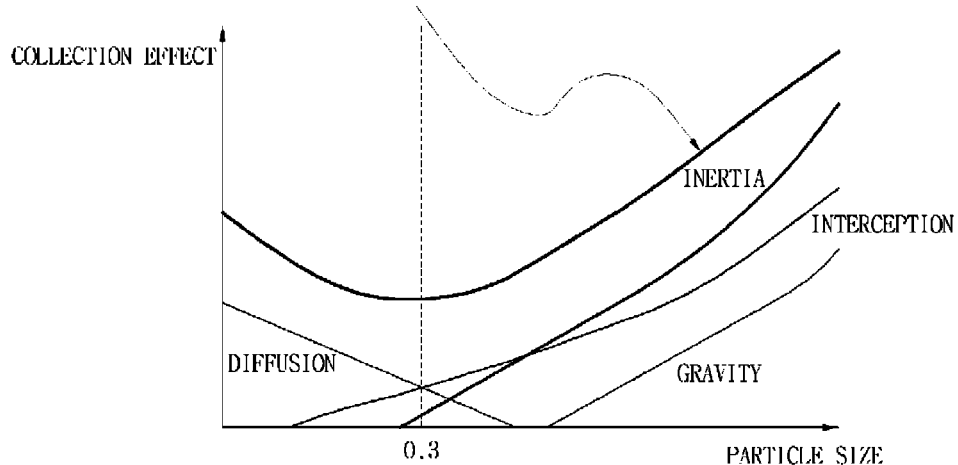
FIGS. 2A to 2C are views that compare performances of the electrostatic non-woven intake filter using the method for manufacturing the electrostatic non-woven intake filter according to an exemplary embodiment of the present invention and an electrostatic non-woven intake filter.
Figure 2:
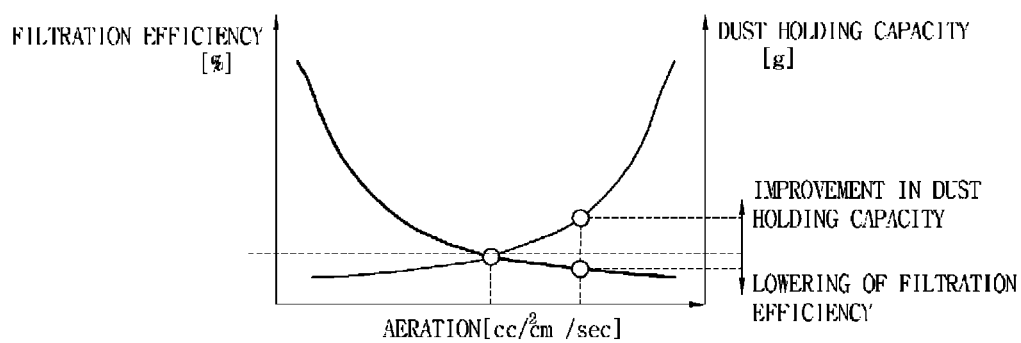
Figure 2:
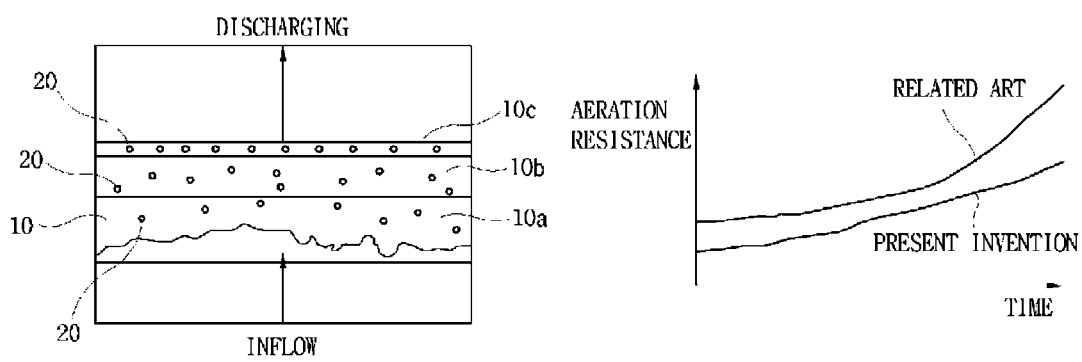

FIGS. 2A to 2C illustrate performance comparison line views of electrostatic non-woven intake filter material 16 according to an exemplary embodiment of the present embodiment in conjunction with a filter performance line view.

As shown in FIG. 2A, the filter has the diffusion effect, inertia effect, the gravity effect, and interception effect, and these effects show a synergy effect, thereby ensuring the entire collection performance of the filter.

In addition, as shown in FIG. 2B, correlation between the filtration efficiency and dust holding capacity of the filter are in inverse proportion.

Electrostatic non-woven intake filter material 10 according to an exemplary embodiment of the present embodiment makes the three layer structure of bulk layer 10a, middle layer 10b, and fine layer 10c that have different amounts and thicknesses of the permeating electrostatic material 20, such that as described above, the filtration efficiency is increased while the aeration property is not lowered by implementing the optimum point of the filtration efficiency and the dust holding capacity that are in inverse proportion.

FIG. 2C illustrates, when the performance of the air cleaner is tested according to the same condition (predetermined air amount and dust addition amount), an aeration resistance change line view of a general filter and electrostatic non-woven intake filter 16 that is made of electrostatic non-woven intake filter material 10 according to an exemplary embodiment of the present embodiment.

As shown in the drawing, in the case of the general filter, the aeration resistance is changed as a secondary function when the dust holding capacity evaluation performance of the air cleaner is tested, but in the case of electrostatic non-woven intake filter 16 according to an exemplary embodiment of the present embodiment, the aeration resistance is changed as a primary function.

In general, an air permeability of the air cleaner for vehicles should satisfy an initial air permeability of about 98.5% or more and a life air permeability of about 99.5% or more.

Electrostatic non-woven intake filter 16 according to an exemplary embodiment of the present embodiment has the aeration resistance change line view as the primary function, increases a collection ability so that the dust particles are collected by the fibers of the filter by the size thereof because of the reinforced interception effect of electrostatic non-woven intake filter 16, and the dust holding capacity of the fibers using an induction charge by the electrostatic effect that is newly provided through the semipermanent electrostatic force that is formed in the fibers, thereby satisfying the air permeabilities of the air cleaner to which the filter is applied.

This is proved through the performance test according to the same condition (predetermined air amount and dust addition amount) after electrostatic non-woven intake filter 16 is applied to the air cleaner.

Filter processing process C according to an exemplary embodiment of the present embodiment is a process for shaping a non-woven fabric that is electrostatic non-woven intake filter material 10 in which the filtration efficiency is increased while the aeration property is not lowered.

As shown in FIG. 1, a fabric processing step 13 makes a bent form by using a roll type of non-woven fabrics, and allows it to have an appropriate size.

In the process, the bent form means a form that has a predetermined width and a bent that is caused by overlapping, which is the same shape as the non-woven fabric that is made by the filter.

The manufactured filter shape is obtained by the electrostatic non-woven intake filter that has the frame through a frame shaping step 14, and to this end, a mold for injection molding plastics is used.

That is, by disposing the manufactured filter shape on the mold and injecting plastics to form a filter type boundary, the electrostatic non-woven intake filter that is provided with electrostatic non-woven intake filter material 10 is formed in the frame.

As described above, defects of the manufactured electrostatic non-woven intake filter are inspected by the naked eye of the operator.

Electrostatic non-woven intake filter finish process D according to an exemplary embodiment of the present embodiment is a process for maintaining sealing of the electrostatic non-woven intake filter, and is a process for manufacturing complete electrostatic non-woven intake filter 16 having a sealing property.

A packing step 15 provides a rubber packing along the frame that constitutes the electrostatic non-woven intake filter, thereby manufacturing electrostatic non-woven intake filter 16 that can be directly mounted on the air cleaner as a completed single part that maintains internal sealing performance.

The packing step 15 may be implemented by a manual operation or a process using an automation line.

As described above, in the present embodiment, the fiber fabrics are manufactured through various processes, the web is converted into the felt, the non-woven fabric that is electrostatic non-woven intake filter material 10 is manufactured by permeating the binder and electrostatic material 20 to the felt, and electrostatic non-woven intake filter 16 that has reinforced electrostatic effect and interception effect is manufactured through the packing operation for maintaining sealing.

As described above, since manufactured electrostatic non-woven intake filter 16 is a completed single part, it is directly mounted on the air cleaner.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for manufacturing an electrostatic non-woven intake filter, the method comprising:
    a fabric preparation process that weaves a fiber fabric into a web; and
    a filter fabric manufacturing process that weaves the web into a felt that has at least a layer, and manufactures an electrostatic non-woven intake filter material that is a non-woven fabric having a fiber tissue having a semi-permanent electrostatic force by allowing a binder and an electrostatic material to permeate the felt.

2. The method for manufacturing the electrostatic non-woven intake filter as defined in claim 1, wherein as the electrostatic material, a calixarene compound that has the pH of 6.0 to 9.0 is applied.

3. The method for manufacturing the electrostatic non-woven intake filter as defined in claim 1, wherein the fabric preparation process is performed by a step for making a fiber material into a fine mix state by using a hopper, and a step for weaving the mixed fibers that are discharged from the hopper in a carding step into the web that is manufactured by using strands of fibers.

4. The method for manufacturing the electrostatic non-woven intake filter as defined in claim 3, further comprising a step for forming the web that has improved evenness after the carding step by overlapping the web.

5. The method for manufacturing the electrostatic non-woven intake filter as defined in claim 1, wherein the filter fabric manufacturing process weaves the web by using strands of fibers randomly, weaves the felt that has the at least a layer, synthesizing the electrostatic material in conjunction with the binder to allow the electrostatic material to permeate the felt so that the electrostatic non-woven intake filter material that is the non-woven fabric is manufactured, drying the electrostatic non-woven intake filter material, and shaping the electrostatic non-woven intake filter material in a roll shape.

6. The method for manufacturing the electrostatic non-woven intake filter as defined in claim 5, wherein the felt has a structure that includes three layers having different composition degrees.

7. The method for manufacturing the electrostatic non-woven intake filter as defined in claim 6, wherein thicknesses of the three layers are different from each other.

8. The method for manufacturing the electrostatic non-woven intake filter as defined in claim 7, wherein the three layers includes a fine layer, a middle layer and a bulk layer formed sequentially and the thickness of the fine layer is smallest and the thickness of the bulk layer is largest.

9. The method for manufacturing the electrostatic non-woven intake filter as defined in claim 5, wherein the electrostatic material and the binder that are powder are mixed and provided.

10. The method for manufacturing the electrostatic non-woven intake filter as defined in claim 1, further comprising:
    a filter processing process as a post treatment process of the electrostatic non-woven intake filter material, which forms a frame that receives the electrostatic non-woven intake filter material; and
    an electrostatic non-woven intake-filter finish process that adds a packing to the frame to obtain sealing, thereby manufacturing the electrostatic non-woven intake filter.

11. The method for manufacturing the electrostatic non-woven intake filter as defined in claim 10, wherein the filter processing process is a step that overlaps the electrostatic non-woven intake filter materials to obtain a bent form and forms the frame constituting a circumference that receives the electrostatic non-woven intake filter material.

12. The method for manufacturing the electrostatic non-woven intake filter as defined in claim 11, wherein the frame is obtained by injection molding a plastic.

13. An electrostatic non-woven intake filter that is manufactured through claim 1 and has an internal fiber tissue having a semipermanent electrostatic force.

14. The electrostatic non-woven intake filter as defined in claim 13, wherein the internal fiber tissue is permeated by the electrostatic material and has a structure of three layers having different fiber composition degrees.

15. The electrostatic non-woven intake filter as defined in claim 14, wherein the three layers sequentially include a bulk layer, middle layer and fine layer that allow the electrostatic material to permeate the three layers.

16. The electrostatic non-woven intake filter as defined in claim 15, wherein the bulk layer, middle layer and fine layer formed sequentially have different thicknesses.

17. The electrostatic non-woven intake filter as defined in claim 16, wherein the thickness of the fine layer is smallest and the thickness of the bulk layer is largest.

18. The electrostatic non-woven intake filter as defined in claim 15, wherein in the bulk layer, middle layer and fine layer, the electrostatic material is uniformly distributed.

19. The electrostatic non-woven intake filter as defined in claim 15, wherein the bulk layer and middle layer require dust holding capacity performance and aeration resistance performance, and the fine layer requires efficiency/aeration performance and bendability/shape maintaining function.

* * * * *